(12) United States Patent
Gao

(10) Patent No.: US 7,995,510 B2
(45) Date of Patent: Aug. 9, 2011

(54) METHOD FOR IMPLEMENTING BROADCAST/MULTICAST AREA MANAGEMENT IN A WIRELESS COMMUNICATION SYSTEM

(75) Inventor: Quanzhong Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 716 days.

(21) Appl. No.: 11/862,162

(22) Filed: Sep. 26, 2007

(65) Prior Publication Data

US 2008/0080408 A1    Apr. 3, 2008

Related U.S. Application Data

(63) Continuation of application No. PCT/CN2006/000494, filed on Mar. 24, 2006.

(30) Foreign Application Priority Data

Mar. 26, 2005  (CN) .......................... 2005 1 0060122
Apr. 12, 2005  (CN) .......................... 2005 1 0063554

(51) Int. Cl.
*H04H 20/00* (2008.01)
*H04W 4/00* (2009.01)

(52) U.S. Cl. .................... 370/312; 370/329; 370/341

(58) Field of Classification Search ................. None
See application file for complete search history.

(56) References Cited

U.S. PATENT DOCUMENTS

| | | | | |
|---|---|---|---|---|
| 2003/0211843 | A1* | 11/2003 | Song et al. ............... | 455/411 |
| 2004/0087319 | A1 | 5/2004 | Bos et al. | |
| 2004/0202329 | A1* | 10/2004 | Jung et al. ............... | 380/273 |
| 2004/0203816 | A1 | 10/2004 | Bae et al. | |
| 2005/0063409 | A1* | 3/2005 | Oommen ............... | 370/432 |
| 2005/0083913 | A1* | 4/2005 | Choi et al. ............... | 370/352 |
| 2005/0183126 | A1* | 8/2005 | Murao et al. ............... | 725/75 |
| 2005/0283447 | A1* | 12/2005 | Xu et al. ............... | 705/400 |
| 2006/0276178 | A1* | 12/2006 | Jeon ............... | 455/411 |
| 2007/0184807 | A1* | 8/2007 | Aoki et al. ............... | 455/312 |

FOREIGN PATENT DOCUMENTS

| | | |
|---|---|---|
| CN | 1486002 | 3/2004 |
| CN | 1507190 A | 6/2004 |
| WO | 2004102878 A1 | 11/2004 |
| WO | 2006/102831 A1 | 10/2006 |

OTHER PUBLICATIONS

Office action issued in corresponding Chinese patent application No. 200510063554.7, dated Jul. 27, 2007, and English translation thereof, total 7 pages.

(Continued)

*Primary Examiner* — Chi H Pham
*Assistant Examiner* — Soon-Dong D Hyun

(57) ABSTRACT

The present invention relates to a method for implementing broadcast/multicast area management in a wireless communication system. The method mainly comprises: firstly configuring and storing information of the broadcast area in a network entity of the wireless communication system; then sending a request message to the network side entity when a client terminal in the wireless communication system needs to obtain the broadcast/multicast service, and the network side entity performs area authentication on the subscriber's request message according to the configured information of the broadcast area so as to support management of broadcast programs based on location areas. Meanwhile, the network side may initiate establishment of a service stream with the configured location area.

22 Claims, 4 Drawing Sheets

OTHER PUBLICATIONS

Office action issued in corresponding Chinese patent application No. 200710153064.5, dated Jul. 17, 2009, and English translation thereof, total 8 pages.

Written Opinion issued in corresponding PCT application No. PCT/CN2006/000494, dated Jul. 27, 2006, total 3 pages.

3GPP2 A.S0019-0,Version 1.0: "Interoperability Specification (IOS) for Broadcast Multicast Services (BCMCS)",Dated Nov. 2004, total 110 pages.

3GPP2 C.S0024,Version 4.0: "CDMA2000 High Rate Packet Data Air Interface Specification", dated Oct. 25, 2002, total 548 pages.

3GPP2 C.S0054-0,Version 1.0: "cdma2000 High Rate Broadcast-Multicast Packet Data Air Interface Specification Copyright", dated Feb. 2004, total 101 pp.

3GPP2 S.S0083-A,Version 1.0: "Broadcast-Multicast Service Security Framework", dated Aug. 26 ,2004, total 18 pages.

3GPP2 X.S0022-0,Version 1.0: "Broadcast and Multicast Service in cdma2000 Wireless IP network", dated Mar. 2005, total 99 pages.

* cited by examiner

METHOD FOR IMPLEMENTING BROADCAST/MULTICAST AREA MANAGEMENT IN A WIRELESS COMMUNICATION SYSTEM The present application is a continuation of PCT application PCT/CN2006/000494, filed on Mar. 24, 2006, entitled "Method for Implementing Broadcast/Multicast Area Management in a Wireless Communication System", which is incorporated by reference herein in its entirety.

TECHNICAL FIELD

The present invention relates to the technical field of wireless communication, and in particular to a method for implementing broadcast/multicast area management in a wireless communication system.

BACKGROUND OF THE INVENTION

In order to use mobile communication network resources effectively, WCDMA/GSM global standardizing organization 3GPP proposed the broadcast/multicast service (BCMCS), with which a Point To Multi-Point service of sending data from one data source to multiple users may be provided in a mobile communication network, thereby realizing network resources sharing and improving the utilization rate of the network resources, especially the air interface resources. The broadcast/multicast service defined by 3GPP may realize not only a low speed message type broadcast/multicast which contains plain text, but also a broadcast/multicast of a high speed multimedia service, which is in accordance with the tendency of future mobile data service development.

The multicast/broadcast service is based on a WCDMA/GSM packet network. By adding some new function entities such as a broadcast/multicast service controller, the BCMCS function is added to the existing packet domain function entities such as packet data service nodes (PDSN), radio network controllers (RNC) and user equipments (UE), etc. and new logically shared channel is defined so as to realize air interface resources sharing.

The major technical feature of the broadcast/multicast service (BCMCS) is that the air interface traffic channel is a shared broadcast channel which may provide information of the same contents to a plurality of users simultaneously. If the BCMCS is implemented in a wireless communication system, the BCMCS such as TV-On-Mobile may be operated in wide range with low cost, thus giving prominence to the advantage in operation of the 3G network. BCMCS is a major service in a 3G network.

The architecture of a BCMCS network will now be described. As shown in FIG. 1, a BCMCS network specifically includes:

A BCMCS controller: i.e. the IP host in the operator network used for storing session information of BCMCS, the session information includes: correspondence relationship between a program title and a multicast address, a port number and the ID of a BCMCS stream; the information of the service bearer, such as the IP header compression parameter; and parameters relating to encryption and security, such as broadcast access key (BAK). The BCMCS controller is used for providing BCMCS session information to a terminal in the process when the terminal initiates a "content information acquisition" to inquire the session information, and for providing session information to a broadcast serving node (BSN), an access network/packet control function (AN/PCF) unit, and a content server, so as to establish the service bearer. Meanwhile, the BCMCS controller also participates in user authentication.

A BCMCS content server: which is used for converting contents from a service provider into a format required by the session, for example, a designated encoding format, according to the session information stored in the BCMCS controller, and for converting BCMCS contents into an IP multicast stream and forwarding the stream to a multicast router (MR).

A BCMCS content provider: which is a provider of BCMCS contents, the contents may be provided by a third party content provider or by the operator itself.

A BCMCS Service Node (BSN): the A10 service bearer established by the BSN is unidirectional, and only performs point-to-point protocol (PPP) encapsulation. The mode of header compression of the BSN is not negotiation but obtaining from the BCMCS controller. The BSN interfaces upwardly only with the BCMCS controller and the content server, and negotiates with the multicast router to join the multicast group, so as to obtain the IP multicast stream of MCMCS.

A Multicast Router (MR): which is a standard multicast router complying with IETF RFC. If the multicast IP stream between the content server and BSN is transmitted through a tunnel, this network element may be omitted.

An Access Network/Packet Control Function (AN/PCF) unit: which is responsible for establishing and releasing the bearer between an AT (terminal) and the BSN. This unit may also perform link layer encryption for the borne services.

An Authentication/Authorization/Accounting server (AAA): which is responsible for performing authentication, authorization and accounting for the BCMCS, and providing information about the services subscribed for by a user to the BCMCS controller.

A Packet Data Service Node (PDSN): which may communicate with the AN/PCF to establish and release the bearer of a unicast IP stream in the wireless network, and may establish a PPP connection with the AT, so that the AT may obtain the unicast IP address and establish communication with the BCMCS controller.

Now the process of broadcast/multicast will be described with reference to the drawings.

Firstly, the operator issues to the AN/PCF and BCMCS controller information about bandwidth of each stream and the strategies such as whether a soft combination is needed. The BCMCS controller, the AAA server, the CS (Content Server) and the BSN are configured according to the strategies of the operator.

After configuring the corresponding information, the subscriber obtains the program title from the website run by the operator. The subscriber (MS) firstly finds the BCMCS controller address through the configured BCMCS controller address or through a Dynamic Host Configuration Protocol (DHCP); then obtains program information, time information, etc. from the BCMCS controller by means of the Wireless Application Protocol (WAP), Hyper Text Transmission Protocol (HTTP), Short Message Service (SMS) or terminal built-in BCMCS applications etc.

The subsequent process is as shown in FIG. 2, which includes:

step 11: the MS sends a message to the BCMCS controller to obtain session related information of the BCMCS program: BCMCS_FLOW_ID, compression parameters, multicast address/port, security-related parameters, such as BAK. The message carries identification information of the MS;

step 12: the BCMCS controller returns an authentication challenge to the MS after receiving the message from the MS requesting to obtain the program title;

step 13: the MS calculates a response value based on the authentication challenge and a Register Key (RK), and sends the response value to the BCMCS controller through a request message;

the RK was obtained when the subscriber activated the service, and the RK and the relevant accounting category information was also obtained by the AAA server;

step 14: the BCMCS controller sends a request message to the AAA server, wherein the authentication response information returned from the MS is carried in the message;

step 15: after receiving the request message, the AAA server performs access authentication on the MS by means of the RK in the message;

step 16: the AAA server sends the program allowed to be watched by the MS, a temporary key (TK) generated with the RK of the subscriber and a TK_Rand to the BCMCS controller according to the result of the authentication;

step 17: the BCMCS controller performs an encryption on the program that may be watched and the corresponding BAK with the TK, and then distributes the relevant information of the program and the TK-Rand to the MS at the same time. Upon reception, the terminal MS generates the TK by using the RK stored in the terminal itself and the acquired TK-Rand, so as to decrypt the BAK, then the corresponding program may be watched with the BAK.

After the above processes, the subscriber MS starts to monitor system messages of the present cell to receive the BCMCS program broadcasted in the cell.

The specific registration process is as shown in FIG. 3, which includes the following steps:

step 21: the MS sends a registration message to the AN/PCF or BSC/PCF, the registration message carries the authentication signature and stream identification information;

step 22: the AN/PCF sends a broadcast service request message to BSN;

step 23: the BSN forwards the broadcast service request message, i.e. the request message, to the BCMCS controller;

the format of the request message is as shown in table 1:

TABLE 1

| Information Element | Element Direction |
| --- | --- |
| A9 Message Type | BS/AN→PCF |
| Correlation ID | BS/AN→PCF |
| Mobile Identification (IMSI/ATI) | BS/AN→PCF |
| BCMCS Flow and Registration Information | BS/AN→PCF | step 24: the BCMCS controller authenticates the registration of the MS after receiving the message, and requests to establish a service bearer;

meanwhile, the BCMCS controller configures the mapping relationship between the physical channel and the logical channel as well as the correspondence between the logical channel and the stream ID according to the bandwidth requirement of the stream provided by the operator and the network coverage condition;

step 25: the BSN establishes the corresponding service bearer and returns an allowing access message to the AN/PCF;

the allowing access message carries common session information, BSN session information, and RN session information;

step 26: the BSC/PCF sends a registration request message to the BSN;

step 27: the BSN returns a registration response message to the BSC/PCF, so as to complete the process of registration to the BSN;

step 28: a service bearer is established between the MS and the content server, then the BCMCS (i.e. program stream information) on the content server may be sent to the corresponding MS via the service bearer.

The BSN is also used for collecting accounting information to report to the AAA server, so that the AAA server may perform user accounting.

It may be seen from the above prior art that, at present, the BCMCS request message involves only authentication with respect to the user, but no authentication with respect to the area. However, in the practical development of services, an operator may hope that certain programs are broadcasted only in specific areas. Moreover, at present, subscribers or AN/PCF are not divided according to the area with respect to the broadcasted services. Meanwhile, the accounting approach for the same stream in the prior art is not able to support the difference among areas.

The service establishment initiated from the network side does not include the area information at present, which may cause a BCMCS program to be established over a large area and results in waste of resources. Therefore, a pertinent area management mechanism is lacking.

SUMMARY OF THE INVENTION

In view of the problems existing in the prior art as mentioned above, an object of the present invention is to provide a method for implementing broadcast/multicast area management in a wireless communication system, which could realize authentication processing with respect to an area, thereby satisfying the operator's requirement of providing the broadcast service only in certain areas.

The object of the present invention is achieved by the following technical solutions:

A method for implementing broadcast/multicast area management in a wireless communication system according to the present invention includes:

configuring or obtaining through signaling information of a broadcast area in which broadcast of a broadcast/multicast service is allowed;

receiving, by a network side entity, a request message that is sent to the network side entity by a client end;

performing, by the network side entity, service authentication or area authentication on the request message of the client end according to information carried in the request message and the information of the broadcast area, and notifying authentication information to other function entities.

The network side entity is:

a broadcast/multicast service controller, an access control function entity, or a broadcast/multicast service node in the wireless communication system.

The access control function entity includes:

an access network/packet control function unit or a base station controller/packet control function unit.

The information of the broadcast area is information of the broadcast physical area or information of the broadcast logical area, which is determined on the basis of each cell, sector, carrier, base station, access control function entity, broadcast/multicast service node or broadcast/multicast service type in the wireless communication system.

The request message that is sent to the network side entity by the client end is sent in a process which includes:

sending, by the client end, the request message to the access control function entity;

sending, by the access control function entity, the request message to a broadcast/multicast service node, the request message carrying information of a broadcast area to which the access control function entity belongs, and sending the request message to a broadcast/multicast service controller through the broadcast/multicast service node.

The request message that is sent to the network side entity by the client end is sent in a process which includes:

sending, by the client end, the request message to the broadcast/multicast service node through the access control function entity; sending, by the broadcast/multicast service node, the request message to the broadcast/multicast service controller, the request message carrying information of a broadcast area to which the broadcast/multicast service node belongs.

The cell, sector, frequency point, base station, access control function entity, or broadcast/multicast service node at least belongs to one broadcast logical area.

The process of performing, by the network side entity, service authentication or area authentication on the request message of the client end according to information carried in the request message and the information of the broadcast area, and notifying authentication information to other function entities includes:

determining, by the access control function entity, broadcast/multicast service node or broadcast/multicast service controller, a broadcast area in which the client end is located according to a received request message;

according to the broadcast area in which the client end is located and configured information of the broadcast area, determining, by the broadcast/multicast service controller, information of the broadcast area in which the client end is located on the basis of the information of the broadcast area carried in the received request message and/or a source of the received request message on the access control function entity, the broadcast/multicast service controller or the broadcast/multicast service node.

In the request message an independent field is employed to carry the information of the broadcast area, or a stream identification field corresponding to a given algorithm is employed to carry the information of the broadcast area, or the original message is extended to identify the information of the broadcast area.

The method further includes:

dynamically updating the information of the broadcast area configured/stored in a corresponding network side entity;

distributing, by the network side entity, to a corresponding client end the information of the broadcast area in which the client end is located and broadcast/multicast service information that is allowed to be received by the broadcast area;

determining, by the client end, whether to initiate a broadcast/multicast service request according the received information and the information of the broadcast area in which the client end is currently located.

Another method for implementing broadcast/multicast area management in a wireless communication system according to the present invention includes:

configuring information of a broadcast area, in which broadcast of a broadcast/multicast service is allowed, in a network side entity in the wireless communication system;

sending, by the network side entity, a service establishing message to the client, the service establishing message carrying the information of the broadcast area, and determining the broadcast area to which the broadcast/multicast service is to be distributed according to the configured information of the broadcast area in which broadcast of the broadcast/multicast service is allowed;

distributing the broadcast/multicast service to the determined broadcast area.

The process of configuring information of a broadcast area, in which broadcast of a broadcast/multicast service is allowed, in a network side entity in the wireless communication system includes:

configuring broadcast logical area description information and a corresponding packet control function unit identification, access control function entity identification and/or broadcast/multicast service node identification on the broadcast/multicast service controller, and configuring information of an actual position of the broadcast logical area on a base station controller;

uniformly distributing the configured information of the broadcast logical area to the access control function entity through a network management device or the broadcast/multicast service controller; or configuring the information of the broadcast area in lower level network side entities corresponding to the broadcast logical area respectively in a layered configuration mode.

The process of sending, by the network side entity, a service establishing message to a client end, the service establishing message carrying the information of the broadcast area, and determining the broadcast area to which the broadcast/multicast service is to be distributed according to the configured information of the broadcast area in which broadcast of the broadcast/multicast service is allowed includes:

when a service stream is to be initiated in at least one broadcast logical area, sending, by the broadcast/multicast service controller, a service establishing request message carrying the information of the broadcast logical area and the corresponding packet control function unit identification and access control function entity identification to a broadcast/multicast service node that corresponds to the configured broadcast logical area, wherein one service establishing request message carries information of at least one broadcast logical area;

the broadcast/multicast service controller only needs to have the corresponding information of the broadcast logical area carried in the service establishing request message, when the information of the broadcast logical area is configured on the network side entity in a layered configuration mode.

The process of sending, by the network side entity, a service establishing message to a client end, the service establishing message carrying the information of the broadcast area, and determining the broadcast area to which the broadcast/multicast service is to be distributed according to the configured information of the broadcast area in which broadcast of the broadcast/multicast service is allowed further includes:

sending, by each broadcast/multicast service node, a service establishing request to a corresponding packet control function entity and access control function entity according to the packet control function identification and access control entity identification carried in the received service establishing request message;

determining a corresponding lower level network side entity on each network side entity according to the information of the broadcast logical area, and sending the service establishing request to the corresponding lower level network side entity.

The process of sending, by the network side entity, a service establishing message to a client end, the service establishing message carrying the information of the broadcast area, and determining the broadcast area to which the broadcast/multicast service is to be distributed according to the configured information of the broadcast area in which broadcast of the broadcast/multicast service is allowed further includes:

sending, by each packet control function unit, the service establishing request to a corresponding access control entity according to the access control entity identification carried in the received service establishing request message.

The process of sending, by the network side entity, a service establishing message to a client end, the service establishing message carrying the information of the broadcast area, and determining the broadcast area to which the broadcast/multicast service is to be distributed according to the configured information of the broadcast area in which broadcast of the broadcast/multicast service is allowed further includes:

establishing, by the access control function entity, a bearer for service streams of all the cells, sectors, frequency points and/or base stations belonging to the corresponding broadcast logical area according to the information of the broadcast logical area carried in the service establishing request message.

In the request message, an independent field is employed to carry the information of the broadcast logical area, or a stream identification field corresponding to a given algorithm is employed to carry the information of the broadcast logical area, or the original message is extended to identify the information of the broadcast logical area.

The method further includes:

returning, by the network side entity that receives the service establishing request message, a service establishing request response message to a sending party, the response message includes information of success or failure of service establishing, the node or cell having the service successfully established, or the node or cell not having the service successfully established;

dynamically updating a range of broadcast area among the access control entity, the broadcast/multicast service controller, the packet control function unit and the broadcast service node by signaling.

The network side entity is:

an access control entity, a broadcast/multicast service controller, a packet control function unit or a broadcast service node.

There is provided a network side entity according to an embodiment of the invention, which is adapted to receive a request message that is sent to the network side entity by a client end, perform service authentication or area authentication on a request message of a client end according to information carried in the request message and information of the broadcast area, and notify authentication information to other function entities.

There is further provided a network side entity according to an embodiment of the invention, which is adapted to receive a request message that is sent to the network side entity by a client end, perform service authentication or area authentication on a request message of a client end according to information carried in the request message and information of the broadcast area, and notify authentication information to other function entities.

It can be seen from the technical solutions provided in the present invention as described above that the present invention overcomes the defect that the present BCMCS request message has authentication only with respect to users but no authentication with respect to areas, thus during the practical development of services, feasible solutions are provided for operators that hope certain programs to be broadcasted only in certain areas, and realizes authentication of a user based on the broadcast area where the user locates. Meanwhile, in the present invention, accounting processing is also performed with respect to contents of the program watched by a user based on the broadcast area, and an operator is enabled to voluntarily initiate service establishing with respect to certain areas.

Therefore, the present invention can be used to chose only certain areas for broadcast, or to divide areas with respect to broadcast services, thus flexibly implementing broadcast/multicast of multimedia services and providing corresponding solution for managing the broadcast service according to different areas. As a result, the operator could more flexibly manage the operation of the broadcast services, which complies with the trend of future mobile data development.

DETAILED DESCRIPTION OF THE INVENTION

In the present invention, an area division with respect to the broadcast services, including division of physical location area and division of logical area, is implemented, and the authentication processing according to the area is implemented. Meanwhile, different processing among areas with respect to the accounting for the same stream can be supported. Thus, the demand of flexible operation raised by an operator may be met.

To facilitate further understanding of the present invention, specific embodiments of the method according to the present invention will be described in detail below with reference to the drawings.

Figure 1:
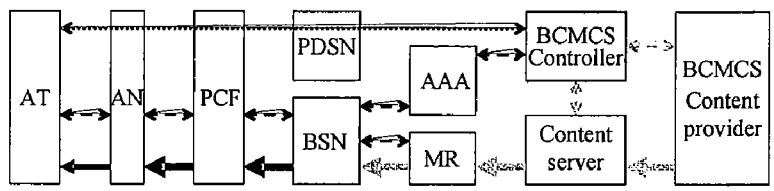
FIG. 1 is a schematic diagram showing the architecture of a broadcast/multicast service network.
Figure 2:
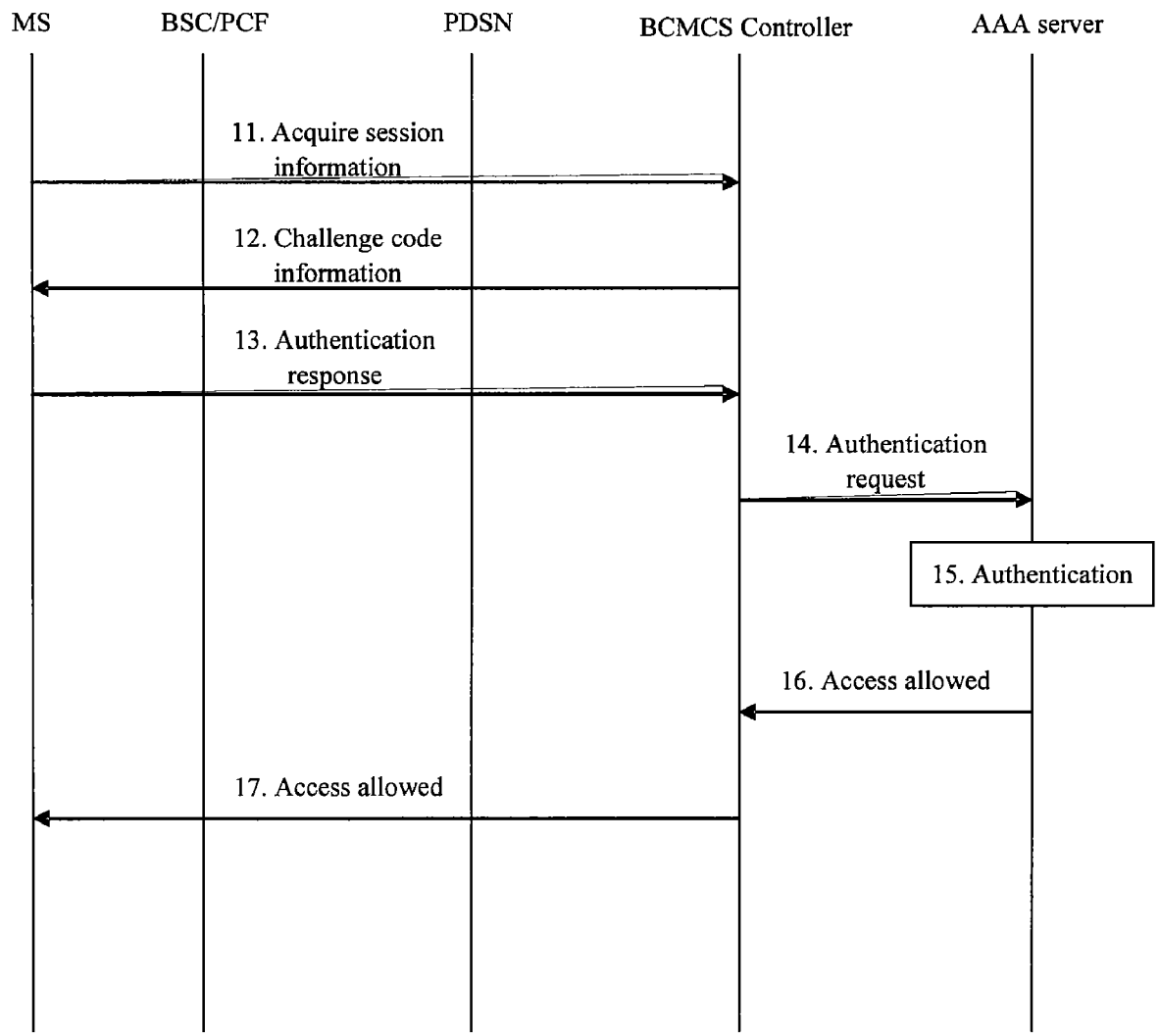
FIG. 2 is a schematic diagram showing the processing of the broadcast service authentication.
Figure 3:
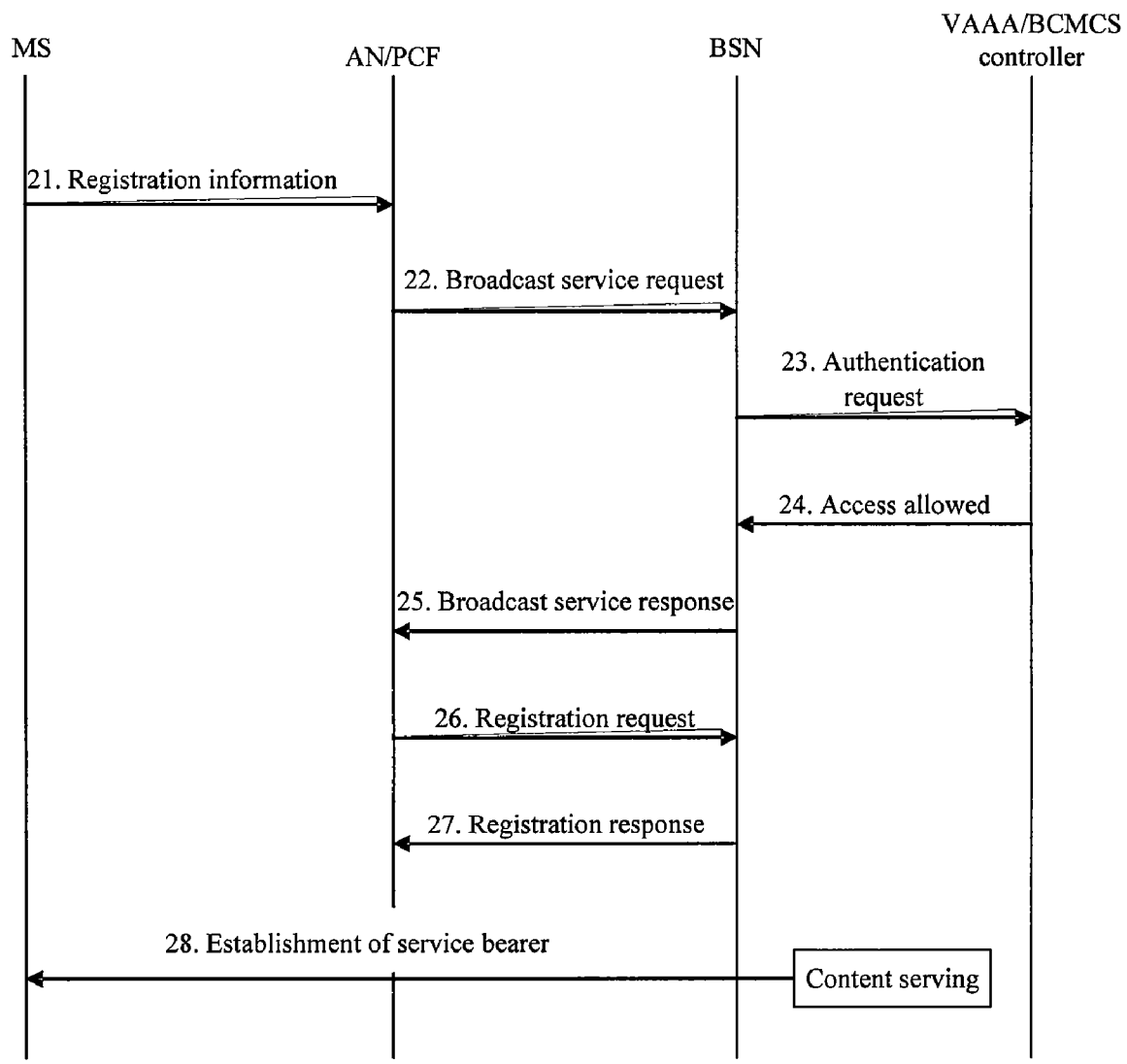
FIG. 3 is a schematic diagram showing the processing of the broadcast service registration.
Figure 4:
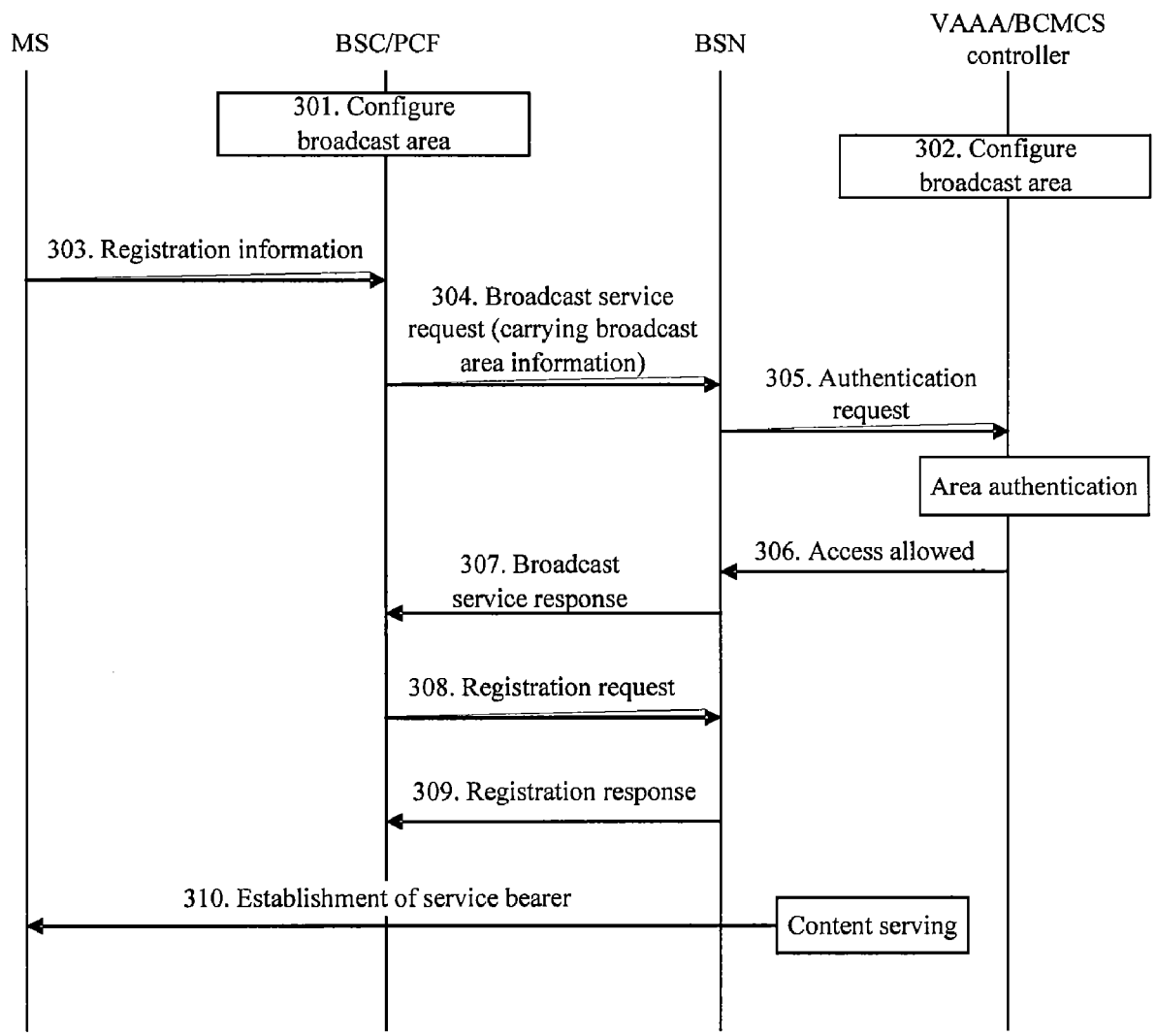
FIG. 4 is a schematic diagram showing the processing of the method according to the present invention.

As shown in FIG. 4, the method according to the present invention includes the following steps:

step 301: obtaining information of a broadcast area to which a cell belongs at an AN/PCF or BSC/PCF;

the packet control function unit (PCF) may be arranged on the AN or in the BSC.

In the present invention, the information of the broadcast area includes specifically a broadcast physical location area or a broadcast logical area. The broadcast physical location area refers to a broadcast area which is determined by division based on physical location information or network side entity information according to operation requirements, and the grain size of the broadcast physical location area may be cell, sector, frequency point, base station or access control entity, etc. The broadcast logical area refers to a virtual broadcast area, which may be defined according to the requirements of the service development without being confined by the physical location. For example, all the user terminals belonging to a shopping center group may be considered as one broadcast logical area, at this point, the user terminals are not necessarily within the same range of a network side entity.

In this step, the corresponding information of the broadcast area can be obtained in two ways:

(1) the AN/PCF may obtain the information of the broadcast area to which the cell belongs through configuration, and the information of the broadcast area to which the cell belongs may be carried when requesting BCMCS.

Network entities such as the AN or BSC may notify via the air interface the information of the broadcast area to which the current cell, the base station or the AN and PCF/BSN belong, the client end may initiate a request for the broadcast/multicast service that it is allowed to receive according to the received information of the broadcast area;

(2) the AN/PCF may obtain the information of the broadcast area to which the cell belongs via signaling (specifically, network side entities such as the AN or BSC obtain the information of the broadcast area configured by the operator in a network management device or other network side entities via signaling), and the information of the broadcast area to which the cell belongs may be carried when requesting BCMCS.

In the present invention, it is also possible to realize dynamic change and addition/deletion of the range of the broadcast area among the access control entity, the BCMCS controller, the PCF and the BSN via signaling, that is, the configured information of the broadcast area stored in the corresponding network side entity may be updated dynamically.

If the AN notifies via the air interface the information of the broadcast area to which the current cell, the base station or the AN and PCF/BSN belong, the information of the broadcast area may also be included in the registration message sent by the client end, so that the information of the broadcast area may be used in the area authentication at the network side.

Step 302: obtaining the information of the broadcast area by the BCMCS controller.

That is to say, in step 301 and step 302, the operator manually determines broadcast areas corresponding to various service contents at first, and then sends to the AN (or BSC)/PCF and BCMCS controller the bandwidth information of each stream and the strategies such as whether soft combination is required.

After the corresponding information of the broadcast area is configured on the AN (or BSC)/PCF and BCMCS controller respectively, authentication processing and accounting processing based on the broadcast area may be performed for the process, in which the subscriber obtains the program information, according to the information of the broadcast area.

As in the prior art, according to the present invention, if the MS is to obtain program information, it firstly has to pass the corresponding authentication processing, so that the BCMCS controller and the MS may obtain the program information that is allowed to be watched by the MS and the corresponding BAK information.

Meanwhile, the subscriber monitors the system message of the cell. If the BCMCS program that the subscriber intends to watch is already broadcasted in the cell, the subscriber may use the obtained key for decryption and receive the corresponding program information. If such program is not yet broadcasted in the cell, the subscriber may initiate the bearer establishing process as the first subscriber in the cell that initiates the registration process, and establish bearer for the dynamic stream.

As shown in FIG. 4, the corresponding registration process in the present invention includes:

step 303: sending a registration message to the AN/PCF by the MS, the message carrying a stream identification and authentication signature information, etc.;

step 304: sending a broadcast service request message to the BSN by the AN/PCF, the message carrying the information of the broadcast area to which the cell belongs, and the stream identification and authentication signature information, etc.;

If the AN/PCF performs proxy authentication, the key checking is performed directly. In this case, the area authentication may be configured on the AN/PCF, so that the proxy authentication may be performed on the AN/PCF, or the authentication may still be performed in the BCMCS controller;

step 305: forwarding, by the BSN, the request message to the BCMCS controller, the message also carrying information of the broadcast area to which the cell where the MS is located belongs, and the stream identification and the authentication signature information, etc.;

the format of the message is as shown in table 2:

TABLE 2

| Information Element | Element Direction |
| --- | --- |
| A9 Message Type | BS/AN→PCF |
| Correlation ID | BS/AN→PCF |
| Mobile Identity (IMSI/ATI) | BS/AN→PCF |
| BCMCS Flow and Registration Information | BS/AN→PCF |
| Critical Vendor/Organization Specific Extension | BS/AN→PCF |

In the message shown in Table 2, the Critical Vendor/Organization Specific Extension field may be used to bear the information of the broadcast area where the user terminal is located.

Upon receiving the request message, the BCMCS controller performs authentication on the request message according to the information of the broadcast area configured in step 302 and other information necessary for authentication.

Specifically, the BCMCS controller needs to perform service authentication and broadcast area authentication, in other words, during authentication, the BCMCS controller checks whether the program stream is allowed to be transmitted to the broadcast area. If yes, it is determined that the broadcast area authentication is passed; otherwise, the broadcast area authentication is failed, and the corresponding program stream will not be transmitted to this area, i.e. it is determined that subscribers in this area is not authorized to receive the program stream.

Step 306: returning the message of allowing access after the authentication is passed;

Step 307: the BSN forwarding the message of allowing access to the AN/PCF;

wherein the message of allowing access includes: Common Session information, BSN Session information, RN session information, etc.;

Step 308 and step 309: the BSC/PCF exchanging information with the BSN to complete the process of registration to the BSN;

Step 310: establishing a service bearer between the MS and the content server. At this point, the BCMCS on the content server may be sent to the corresponding MS via the service bearer.

The AN/PCF configures the mapping relationship between the physical channel and the logical channel as well as the correspondence relationship between logical channels of the stream ID according to the bandwidth requirement of the stream provided by the operator and the network coverage condition.

The configuration of the BCMCS controller, AAA server, CS and the BSN, as well as the flow with which the subscriber obtains the program information are the same as those in the prior art.

Furthermore, the following processing procedure is also the same as that in the prior art:

When the terminal MS initiates a registration process, it starts to monitor the BCMCS overhead channel. If the terminal detects any program content that it needs to receive, the subscriber can directly receive the program content. If the system does not return a refusal message and does not send the service (i.e. the corresponding program stream), the MS needs to initiate registration when registration timer expired. Of course, if the system refuses to provide the program contents that the terminal intends to receive, the terminal cannot initiate registration again to request the network to send the contents that it needs.

In the present invention, if the program contents watched by the subscriber are charged based on time, it is necessary for the RAN (Radio Access Network) to report the accounting information to the BSN, and the BSN collects the accounting information to report to the AAA server which performs accounting on the subscriber. In the present invention, the accounting information needs to include information of the broadcast area where the client terminal receiving the broadcast/multicast service is located, because on the AAA server, the charging rates for watching the same program content at different broadcast areas may be different, and accounting has to be performed with respect to different broadcast areas.

In the present invention, the broadcast area may be a cell as described in the above embodiment, or division of broadcast physical location areas or broadcast logical areas may be performed based on the BSN, PCF, sub-network, BSC, BTS, etc. For example, each BSN may be divided as one broadcast area. In this case, the information of the broadcast area is added to the message when the BSN is to send a request message to the BCMCS controller, and then sent to the BCMCS controller. The difference is that area management is performed on the BSN, that is, division and management of the area are performed on the BSN according to the sub-network information reported by the PCF and the sub-network layout designed by the operator. As for the bottom layer configuration points of the information of the broadcast logical area, the area management is performed on the father node of the network respectively. For example, when the grain size of the broadcast logical area is BTS, the configuration of the information of the broadcast logical area needs to be performed on the BSC, and when the grain size of the broadcast logical area is BSC, the configuration of the information of the broadcast logical area needs to be performed on the PCF.

In the present invention, the operator may also make the stream ID to be corresponding to the information of the broadcast area with a certain naming rule, so as to perform authentication and accounting based on area. The stream ID is usually a series of numbers, and the code name for the information of the broadcast area may also be a series of numbers, so the stream ID and the information of the broadcast area may correspond to each other with a certain mechanism. For example, the first eight bits of the stream ID is identified as the information of the broadcast area, etc. If such a processing mode is adopted, it is still necessary to configure the information of the broadcast area and the area authentication processing on the BCMCS controller, and the terminal and the BSC/PCF need to cooperate to check if the service stream may be provided in the current broadcast area, in other words, the current information of the broadcast area still has to be configured on the BSC/PCF.

In the present invention, information of the broadcast area where the client terminal is located may also be obtained on the BCMCS controller according to the identification information or address information of the BCMCS node or the access control function entity (AN/PCF or BSC/PCF) of the source end that sends the request message. For example, the information of the broadcast area corresponding to the identification information or address information of each AN/PCF may be configured on the BCMCS controller firstly. After receiving the request message, the corresponding information of the broadcast area may be determined according to the identification information or address information of the request message, thereby the information of the broadcast area where the user terminal is located may be determined.

In the present invention, the respective information of the broadcast area, including information of the broadcast physical location area or information of the broadcast logical area, may be configured on the BCMCS controller, the BSC/PCF or the BSN in a wireless communication system, and the establishing of the broadcast/multicast service may be voluntarily initiated for some broadcast areas based on the information of the broadcast area, and the information of the broadcast area is contained in the service establishing request message. That is to say, in the present invention, the information of the broadcast area may be configured on any network side entity among the access control entity, the PCF and the BSN, and service establishment may be initiated based on the broadcast area.

Figure 5:
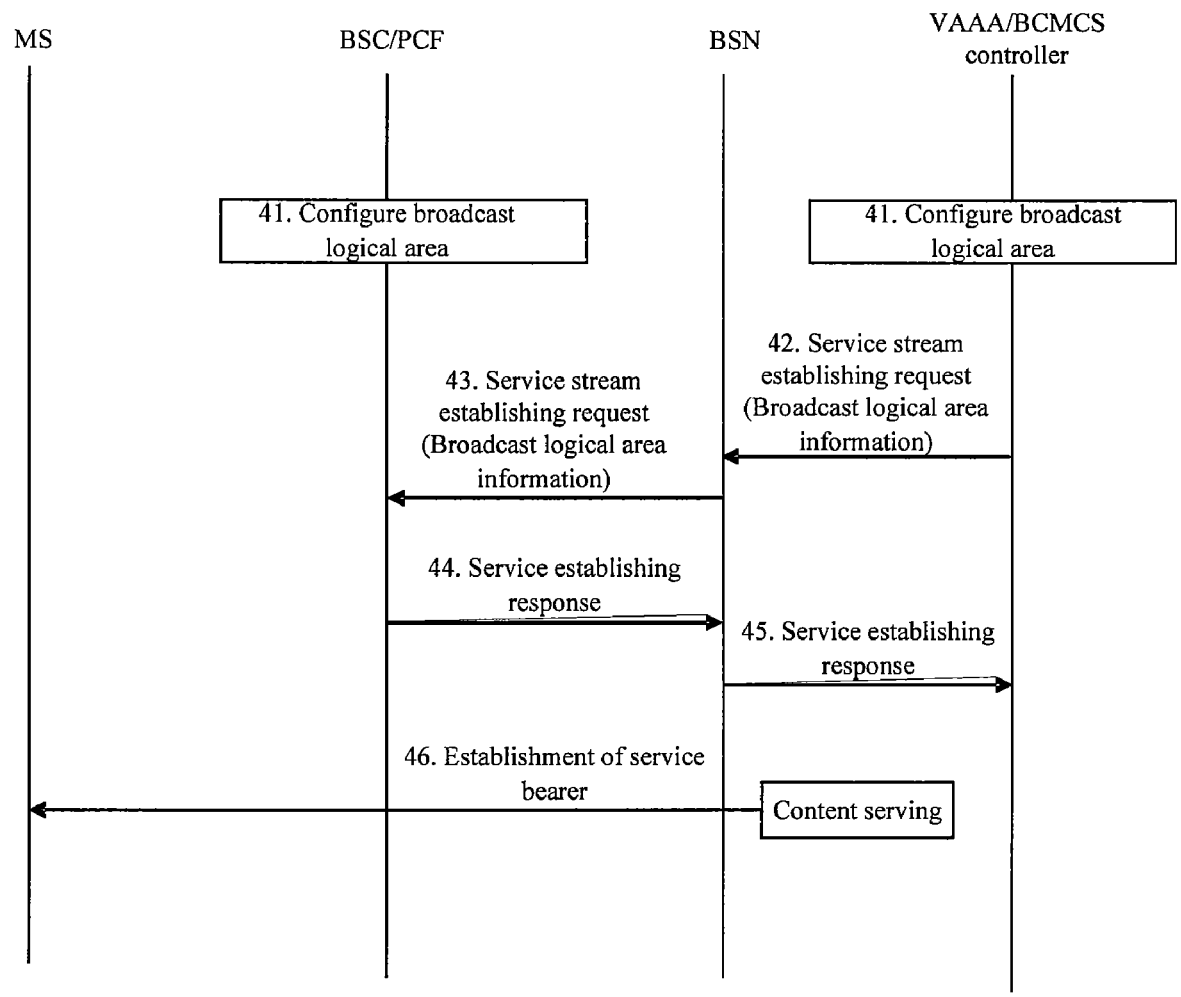
FIG. 5 is a schematic diagram of the processing procedure of another method according to the present invention.

In other words, in specific embodiments of the present invention, the processing described below may also be adopted to implement the area management of the broadcast/multicast service. As shown in FIG. 5, the method of the present invention is further illustrated by taking as an example the configuration of information of the broadcast logical area on the network side entity, while the corresponding processing method of configuring the information of the broadcast physical location area on the network side entity is similar to this. The processing includes:

step 41: configuring the information of a broadcast logical area where the broadcast of the broadcast/multicast service is allowed on the network side entity (e.g. the BCMCS controller or the BCMCS node, or the BSC/PCF) in the wireless communication system, so that the corresponding network side entity may voluntarily initiate the broadcast/multicast service.

In the present invention, the information of the broadcast logical area is defined by the operator, which includes information of all the cells, frequency points, sectors, BTS, access control entities, PCF/BSN associated with the broadcast logical area, and the description of the broadcast logical area. Wherein the description is the identification information of the broadcast logical area, which may specifically be information of the combination of shopping centers and transportation stations, etc.

When configuring information of the broadcast logical area on the BCMCS controller, the configured information includes: information of the BSN address, PCF address, BSC address corresponding to the broadcast logical area and information of the description (combination of shopping centers or combination of transportation stations, etc.) of the area. In the present invention, it is also possible to employ layered configuration to configure the lower level entity corresponding to the broadcast area in network side entities such as the BSN, PCF, sub-network, BSC, BTS level by level. For example, the BSN identification corresponding to the broadcast area is configured on the BCMCS controller, the PCF identification corresponding to the broadcast area is configured on the BSN, and the BSC identification corresponding to the broadcast area is configured in the PCF. Thus the service establishing request message no longer needs to carry the intermediate node information, and upon receiving the service establishing request message, the nodes of each level only needs to look for the lower level node information according to the configured information of the broadcast area and then send the service establishing request message;

In the present invention, if default configuration is employed in the layered configuration, the network side entity needs to send the corresponding message to all of the lower level nodes;

Now the processing of area management will be described by taking the BCMCS controller initiating broadcast/multicast service establishment as an example:

step 42: the BCMCS controller sends service stream establishing request to the BSN, which request carries information of the determined broadcast logical area to which the broadcast/multicast service can be sent, that is, information of the broadcast area is carried in the service establishing message according to the requirements of service, so that the broadcast/multicast service may be sent to the designated broadcast logical area in the subsequent processing.

That is to say, when a wireless communication system needs to initiate a service establishing of a service stream in one or more broadcast logical areas, the BCMCS controller needs to send to the corresponding BSN the service establishing request message carrying the broadcast logical area and its corresponding PCF identification and access control entity identification under the BSN according to all the BSN information corresponding to the configured broadcast logical area The service establishing request message may carry a plurality of broadcast logical areas, and one broadcast logical area may be associated with a plurality of BSN identities, PCF identities, and access control entity identities.

Step 43: the BSN sends the service stream establishing request to the corresponding AN/PCF or BSC/PCF according to the information of the broadcast logical area in the service establishing request message;

The PCF sends a service establishing request to the corresponding access control entity (i.e. AN, etc.) according to the access control entity identification carried in the received service establishing request message.

The access control function entity establishes the bearer of the service stream of all the cells, sectors, frequency points, base stations belonging to the broadcast logical area under the current access control function entity according to the information of the broadcast logical area carried in the service establishing request message, so that the corresponding broadcast/multicast service may be transmitted to the client terminals under the corresponding cells, sectors, frequency points, base station through the bearer.

Step 44: the BSC/PCF sends a service establishing response message to the BSN.

Step 45: the BSN forwards the service establishing response message to the BCMCS controller.

The response message in steps 44 and 45 includes information of success or failure of service establishing, nodes or cells (base stations, BSCs, etc.) having the service successfully established, nodes or cells (base stations, BSCs, etc.) that do not have the service successfully established.

After receiving the service establishing response, the BCMCS controller determines whether it is necessary to re-establish the service and re-establish the broadcast logical area according to the situation, and executes step 47 when it is determined that the service establishing is successful.

Step 46: the service bearer is established between the MS and the content server. At this point, the BCMCS (i.e. the program stream information) on the content server may be sent to the corresponding MS through the service bearer.

Thus, the area management with respect to the broadcast/multicast service may be implemented at the network side, which meets the operation demand of the operator of the broadcast/multicast service.

In summary, the present invention may meet the demand of the network side initiating service establishing according to the broadcast logical area, thus a flexible operation may be supported.

The above described are only preferred embodiments of the present invention, they are not intended to limit the protection scope of the present invention. Any changes or substitutes that may be readily conceived by a technical person familiar with the art within the technical scope disclosed by the present invention shall be considered as being covered by the protection scope of the present invention. Therefore, the protection scope of the invention shall be defined by the appended claims.

What is claimed is:

1. A method for implementing broadcast/multicast area management in a wireless communication system, comprising:
    acquiring, by a network side entity through configuration or signaling, information of a broadcast area in which a broadcast/multicast service is allowed;
    receiving, by the network side entity, a request message from a client end;
    performing, by the network side entity, a service authentication and an area authentication on the client end according to information carried in the request message and the information of the broadcast area, and
    if the client end passes both the service authentication and the area authentication, notifying authentication information of the client end to other functional entities;
    wherein the network side entity is one or more of the following:
    a broadcast/multicast service controller, an access control function entity, and a broadcast/multicast service node in the wireless communication system.

2. The method for implementing broadcast/multicast area management according to claim 1, wherein the access control function entity comprises:
    an access network/packet control function unit or a base station controller/packet control function unit.

3. The method for implementing broadcast/multicast area management according to claim 1, wherein the information of the broadcast area is information of a broadcast physical area or information of a broadcast logical area, said information of the broadcast area is determined on the basis of cells, sectors, frequency points, base stations, access control function entities, broadcast/multicast service nodes or broadcast/multicast service types in the wireless communication system.

4. The method for implementing broadcast/multicast area management according to claim 1,
    wherein the request message is sent by the client end in a process which comprises:
    sending, by the client end, the request message to an access control function entity;
    adding, by the access control function entity, information of the broadcast area to which the access control function entity belongs into the request message;

sending, by the access control function entity, the request message to a broadcast/multicast service node, and sending, by the broadcast/multicast service node, the request message to a broadcast/multicast service controller;

or wherein the request message is sent by the client end in a process which comprises:

sending, by the client end, the request message to the access control function entity, sending, by the access control function entity, the request message to the broadcast/multicast service node;

adding, by the broadcast/multicast service node, information of the broadcast area to which the broadcast/multicast service node belongs into the request message;

sending, by the broadcast/multicast service node, the request message to the broadcast/multicast service controller.

5. The method for implementing broadcast/multicast area management according to claim 3, wherein each of the cells, the sectors, the frequency points, the base stations, the access control function entities, or the broadcast/multicast service nodes at least belongs to one broadcast logical area.

6. The method for implementing broadcast/multicast area management according to claim 4, wherein performing the service authentication and the area authentication on the client end comprises:

determining, by the access control function entity, broadcast/multicast service node or broadcast/multicast service controller, a broadcast area in which the client end is located according to the received request message;

according to the broadcast area in which the client end is located, and according to the acquired information of the broadcast area, determining, by the broadcast/multicast service controller, information of the broadcast area in which the client end is located on the basis of the information of the broadcast area carried in the received request message and/or a source of the received request message.

7. The method for implementing broadcast/multicast area management according to claim 6, wherein the added information of the broadcast area is carried in an independent field of the request message, or wherein the added information of the broadcast area is carried in an extended field of the request message.

8. The method for implementing broadcast/multicast area management according to claim 4, wherein the method further comprises:

storing the information of the broadcast area in the network side entity; and dynamically updating the information of the broadcast area stored in the network side entity.

9. The method for implementing broadcast/multicast area management according to claim 4, wherein the method further comprises:

distributing, by the network side entity, to a corresponding client end located in the broadcast area the information of the broadcast area and the broadcast/multicast service information that is allowed to be received by the corresponding client end;

wherein the information of the broadcast area and the broadcast/multicast service information are used by the corresponding client end to determine whether to initiate a broadcast/multicast service request.

10. A method for implementing management of broadcast and multicast areas in a wireless communication system, comprising:

configuring information of a broadcast area, in which a broadcast/multicast service is allowed, in a network side entity in the wireless communication system;

determining, by the network side entity, the broadcast area to which the broadcast/multicast service is to be distributed according to the configured information of the broadcast area;

sending, by the network side entity, a service establishing message to a client end, wherein the service establishing message carries the information of the broadcast area; and distributing, by the network side entity, the broadcast/multicast service to the client end if the client end is located in the determined broadcast area, wherein the network side entity is one or more of the following:

a broadcast/multicast service controller, an access control function entity, and a broadcast/multicast service node in the wireless communication system.

11. The method for implementing broadcast/multicast area management according to claim 10, wherein configuring information of a broadcast area in the network side entity comprises:

configuring broadcast logical area description information and a corresponding packet control function unit identification, an access control function entity identification and/or a broadcast/multicast service node identification on the broadcast/multicast service controller, and configuring information of an actual position of the broadcast logical area on the base station controller;

uniformly distributing the configured information of the broadcast logical area to the access control function entity through a network management device or the broadcast/multicast service controller; or configuring the information of the broadcast area in lower level network side entities corresponding to the broadcast logical area respectively in a layered configuration mode.

12. The method for implementing broadcast/multicast area management according to claim 11, wherein sending the service establishing message to the client end comprises:

when a service stream is to be initiated in at least one broadcast logical area, sending, by the broadcast/multicast service controller, a service establishing request message carrying the information of the broadcast logical area and the corresponding packet control function unit identification and access control function entity identification to a broadcast/multicast service node that corresponds to the configured broadcast logical area, wherein the service establishing request message carries information of at least one broadcast logical area; and wherein the broadcast/multicast service controller only needs to have the corresponding information of the broadcast logical area carried in the service establishing request message, when the information of the broadcast logical area is configured on the network side entity in a layered configuration mode.

13. The method for implementing broadcast/multicast area management according to claim 12, wherein sending, by the network side entity, the service establishing message to the client end, the service establishing message carrying the information of the broadcast area, and determining the broadcast area to which the broadcast/multicast service is to be distributed according to the configured information of the broadcast area in which broadcast of the broadcast/multicast service is allowed further comprises:

sending, by each broadcast/multicast service node, a service establishing request message to a corresponding packet control function entity and an access control function entity according to the packet control function identification and access control entity identification carried in the received service establishing request message;

determining a corresponding lower level network side entity on each network side entity according to the information of the broadcast logical area, and sending the service establishing request to the corresponding lower level network side entity.

14. The method for implementing broadcast/multicast area management according to claim 13, wherein sending, by the network side entity, a service establishing message to a client end, the service establishing message carrying the information of the broadcast area, and determining the broadcast area to which the broadcast/multicast service is to be distributed according to the configured information of the broadcast area in which the broadcast/multicast service is allowed further comprises:

sending, by each packet control function unit, the service establishing request to a corresponding access control entity according to the access control entity identification carried in the received service establishing request message.

15. The method for implementing broadcast/multicast area management according to claim 13, wherein sending, by the network side entity, a service establishing message to a client end, the service establishing message carrying the information of the broadcast area, and determining the broadcast area to which the broadcast/multicast service is to be distributed according to the configured information of the broadcast area in which broadcast of the broadcast/multicast service is allowed further comprises:

establishing, by the access control function entity, a bearer for service streams of all the cells, sectors, frequency points and/or base stations belonging to the corresponding broadcast logical area according to the information of the broadcast logical area carried in the service establishing request message.

16. The method for implementing broadcast/multicast area management according to claim 14, wherein the information of the broadcast logical area is carried in an independent field of the request message, or wherein the information of the broadcast logical area is carried in an extended field of the request message.

17. The method for implementing broadcast/multicast area management according to claim 14, wherein the method further comprises:

returning, by the network side entity that receives the service establishing request message, a service establishing request response message to a sending party, the response message includes information of success or failure of service establishing, a node or a cell having the service successfully established, or a node or a cell not having the service successfully established.

18. The method for implementing broadcast/multicast area management according to claim 14, wherein the method further comprises:

dynamically updating a range of broadcast area among the access control entity, the broadcast/multicast service controller, the packet control function unit and the broadcast service node by signaling.

19. The method for implementing broadcast/multicast area management according to claim 14, wherein the network side entity is:

an access control entity, a broadcast/multicast service controller, a packet control function unit or a broadcast service node.

20. A network side entity in a wireless communication system, comprising:

a broadcast/multicast service (BCMCS) controller and a broadcast service node (BSN), wherein the BCMCS controller is configured to:

acquire, through configuration or signaling, information of a broadcast area in which a broadcast/multicast service is allowed, wherein the BSN is configured to:

receive a broadcast service request message from a client end, and perform a service authentication on the client end and according to information carried in the broadcast service request message, wherein the BCMCS controller is further configured to:

perform an area authentication on the client end according to information carried in the request message and information of the broadcast area, and wherein if the client end passes both the service authentication and the area authentication, the BSN is further configured to notify authentication information of the client end to other function entities of the wireless communication system.

21. The network side entity according to claim 20, wherein the network side entity is configured to distribute to a corresponding client end information of a broadcast area in which the client end is located and broadcast/multicast service information that is allowed to be received by the broadcast area.

22. A network side entity in a wireless communication system comprising:

a broadcast/multicast service (BCMCS) controller and a broadcast service node (BSN), wherein the BCMCS controller is configured to:

acquire through configuration, information of a broadcast area, in which a broadcast/multicast service is allowed;

determine a broadcast area to which the broadcast/multicast service is to be distributed according to the configured information of the broadcast area; and wherein the BSN is configured to:

send a service establishing message to a client end, wherein the service establishing message carries information of the broadcast area, and distribute the broadcast/multicast service to the client end if the client end is located in the determined broadcast area.

* * * * *